July 16, 1968  W. KNAPP  3,392,806
DISK-BRAKE AND ADJUSTING MEANS THEREFOR
Filed Oct. 11, 1966  3 Sheets-Sheet 1
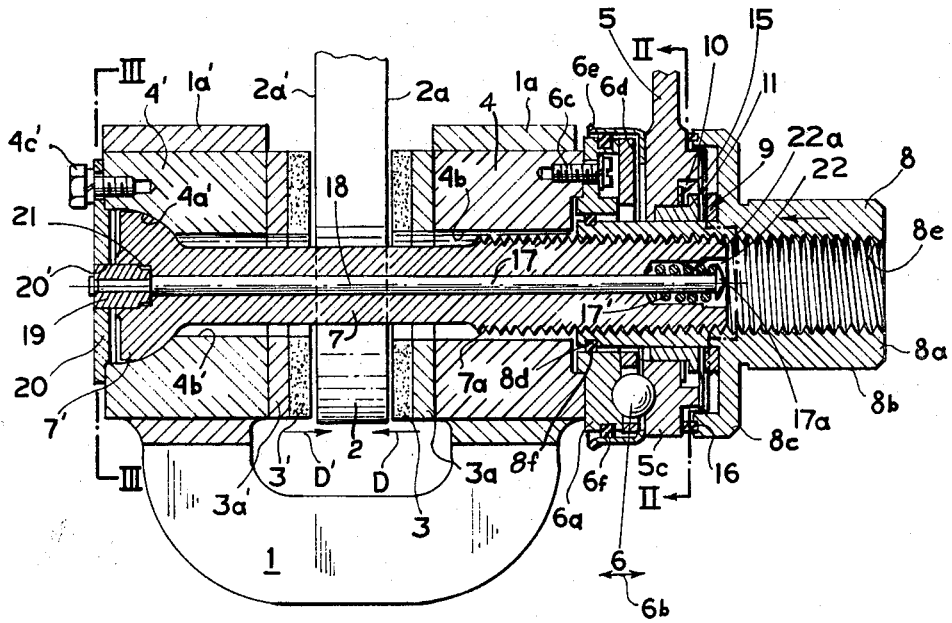
FIG. I
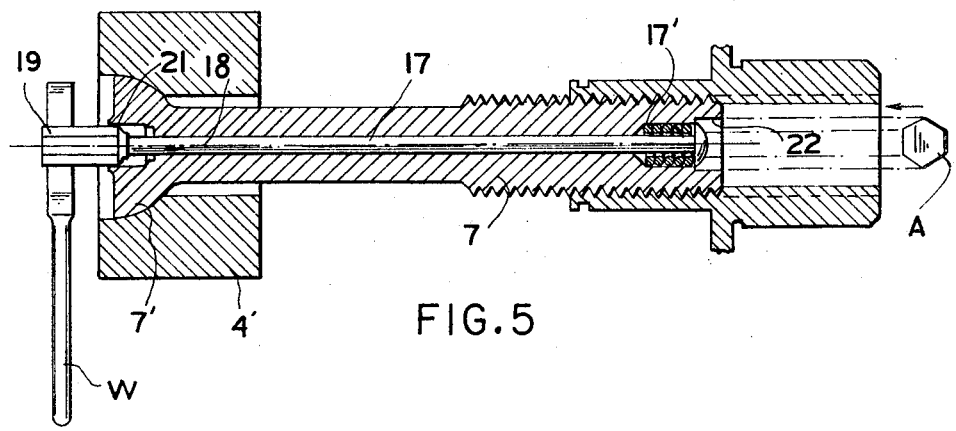
FIG. 5
WILHELM KNAPP
*INVENTOR.*
BY Ross & Mestern
*Attorney*

WILHELM KNAPP
INVENTOR.

July 16, 1968  W. KNAPP  3,392,806
DISK-BRAKE AND ADJUSTING MEANS THEREFOR
Filed Oct. 11, 1966  3 Sheets-Sheet 3

WILHELM KNAPP
INVENTOR.

BY Ross & Mestern
Attorney

United States Patent Office 3,392,806
Patented July 16, 1968

3,392,806
DISK-BRAKE AND ADJUSTING MEANS
THEREFOR
Wilhelm Knapp, Bad Homburg vor der Hohe, Germany
assignor to Alfred Teves, a corporation of Germany
Filed Oct. 11, 1966, Ser. No. 585,877
Claims priority, application Germany, Nov. 4, 1965,
T 29,721
10 Claims. (Cl. 188—73)

ABSTRACT OF THE DISCLOSURE

Disk brake having a yoke on which a pair of brake shoes are relatively movable toward an interposed brake disk, the shoes being driven by a bolt which threadedly mates with a thimble adjacent one brake shoe and has a head in contact with the other brake shoe, an actuating lever terminating in a disk interposed between the first brake shoe and the thimble so as to exert an axial camming force upon the proximal brake shoe and through the thimble upon the remote brake shoe for driving the two brake shoes toward each other; a ratchet assembly inserted between the actuated disk and the thimble unidirectionally rotates the latter to reduce the spacing of the brake shoes when, after excessive wear of the corresponding brake linings, the actuating lever is swung through an angle exceeding a pedetermined limit.

My present invention relates to disk-brake systems of the type wherein a swingable or rotatable actuating element imparts an axial displacement to the brake shoes of the system via camming means (e.g. of the inclined-ramp, wedge, ball-and-incline type) and, more particularly, to a self-adjusting mechanism for this kind of brake.

While a variety of disk-brake systems have hitherto been proposed, they can generally be categorized, in terms of their actuation, whether manual or fluid-responsive, as axial, rotational, scissor or toggle activation. In an axial actuation system, hydraulic fluid or mechanical pressure is applied to one or more shoes of a disk brake which are guided in a yoke or other support for movement in axial direction (i.e. parallel to the disk axis and transverse to the braking faces of the disk). In a toggle or scissor actuation system, a pair of toggle levers, tong-like arms or the like are urged together axially to clamp the brake shoes between them against the intervening disk. In the rotatable-lever system, a cam member is rotatable about a brake axis perpendicular to the disk faces and generally parallel to the disk axis in a plane paralleling the braking faces to cam axially (via a ball arrangement, wedge system or complementarily inclined ramps—for example) a pressure member against at least one brake shoe. When the system is provided with a "floating yoke," the other brake shoe is drawn against a respective brake face by the reaction force upon this rotary lever. Even in non-floating systems (i.e. wherein the yoke constitutes part of or is formed by the brake support), pressure-transmitting means can be provided to apply the reaction pressure of this lever against the remote brake shoe. While the provision of self-adjusting means for compensating wear of the brake shoes is a relatively simple matter for most disk brakes, systems of the latter type have not heretofore been satisfactorily provided with such self-adjusting means. The problem is compounded when the disk brake is of the floating-yoke type.

It is, therefore, the principal object of the present invention to provide an improved self-adjusting mechanism in a disk-brake system having rotary-lever actuation.

A further object of this invention is to provide a floating-yoke disk brake having compact, long-wear and manually settable adjusting means for the automatic compensation of brake-lining wear, and for resetting the play of the brake shoes.

Yet another object of this invention is to provide an improved but relatively simple disk brake of low manufacturing cost and relative ease of repair, with little tendency toward breakdown.

I have found that these objects can be obtained in a disk-brake system of the floating-yoke type comprising a rotatable actuating member swingably mounted in a yoke-type support for angular displacement about a brake axis transverse to the braking faces of the disk, a pair of brake shoes displaceable in the direction of this axis toward and away from these braking faces on this yoke, and camming means for transforming rotary movement of the actuating element into an axial displacement of the brake shoes, when the force-transmitting means for applying the reaction force of the actuating element to the remote brake shoe includes a threaded bolt extending along the brake axis and engaging this brake shoe and a sleeve threadedly engaging the bolt and in force-transmitting relationship with the actuating element while a ratchet connection is provided for rotating the sleeve relatively to the bolt to adjust the brake play.

According to an important feature of this invention, the ratchet connection is formed by a pair of complementary axially juxtaposed sets of teeth surrounding the threaded bolt and respectively coupled with the threaded sleeve or thimble and the rotary actuating lever which preferably has a disk portion interposed between a flange of the thimble and the force-translating means mentioned earlier. The force-translating or camming means, moreover, lies in a plane perpendicular to the axis of the brake between the disk portion of the actuating lever and the pressure block of the proximal brake shoe, the force-transmitting bolt passing through the translating or camming means and this pressure block. It has been found that this arrangement facilitates an automatic adjustment of the brake play and an equalization thereof even if the lining wear is unequal, and also ensures the uniform wear of the brake lining; the thimble or threaded sleeve, moreover, facilitates manual adjustment of the system for initial brake setting, replacement of the lining or the like.

According to still another feature of this invention, the connection between the threaded thimble and the actuating disk is effected by means of complementarily toothed confronting rings whose teeth interengage and are oppositely oriented so that relative rotation of annular sets of teeth in one sense is prevented by the abutment of the steep flanks thereof, whereas relative rotation of these sets in the other sense is accompanied by an axial separation of the teeth through an axial distance equal to twice the height of the steep flanks as the inclined flanks slide along one another. The toothed ring associated with the actuating disk can be provided with rearwardly extending axial formations engaged by the actuating disk so that it is rotatably entrained therewith. These formations may be pins or the like projecting into respective recesses in the actuating disk. The latter can, however, also be provided along its inner periphery with male formations or projections (e.g. generally radial) which are received in corresponding recesses or depressions of the respective toothed ring so that relative axial movement of the disk and its toothed ring is permitted although the ring is always rotatably entrained by the disk. The toothed ring associated with the threaded thimble or sleeve may likewise be keyed to the latter for rotatable entrainment thereof although either the actuating disk or the thimble can be provided according to this invention with a set of teeth complementarily engageable with a toothed ring of the character described, rotatably connected to the other of these confronting members. The thimble may, for this purpose, be provided with guide pins, ribs or the like which are rigid therewith and receive the respective toothed ring with play. The complementary teeth of the ratchet connection are coupled or urged together by means of an axially effective spring (e.g. of the dished or undulating-ring type) housed between the axially movable ring and the member to which it is keyed.

According to a further feature of this invention, the threaded bolt coupling the pressure members of the brake together has a head rotatable with the remote pressure block and co-operates with a locking device normally preventing rotation of the bolt. The antirotation means can include a releasable lock such as a counterscrew arrangement, key or pin which, upon removal or withdrawal, permits rotation of the bolt for manual adjustment of the brake system. Preferably, the locking means includes a pin extending axially through the bolt and slidable therein with its head exposed at the proximal side of the brake system, e.g. through the threaded thimble or sleeve, and having a noncircular configuration at its remote extremity for engagement with the bolt in one axial position of the pin to prevent rotation of the bolt. Moreover, I prefer to provide a socket or key arrangement at the proximal side of the brake within which the pin is lodged so that only a special tool or key is able to axially shift this pin in order to release the bolt for manual rotation. For this purpose, the extremity of the bolt engaging the thimble may be provided with a polygonal (e.g. hexagonal) socket into which a suitable key may be inserted axially (e.g. an Allen wrench or key) to axially shift the pin against the force of restoring-spring means tending to urge the pin from its second position (in which rotation of the bolt is permitted) to the locking first position. The formation at the remote end of the pin can include a polygonal head which may fit into a complementarily shaped head of the bolt and a similarly shaped opening of a removable plate secured to the remote pressure block and overlying the head of the rotatable bolt. When the polygonal head of the pin bridges this plate and the bolt, the nonrotatable plate bars rotation of the bolt. When, however, the pin is shifted axially into its second position, the polygonal head of the pin disengages from the correspondingly shaped socket of the bolt and rotation thereof is permitted.

It will be readily apparent that this arrangement permits adjustment of the brake shoes to be carried out manually from the actuating side of the brake system with considerable ease and also affords automatic compensation for brake-lining wear with a minimum of moving parts and a reduced tendency of the adjusting system toward deterioration.

The above and other objects, features and advantages of the present invention will become more readily apparent from the following description, reference being made to the accompanying drawing in which:

FIG. 1 is a partial axial cross-sectional view of a disk-brake system embodying the present invention;

FIG. 5 is a fragmentary view similar to FIG. 1 showing the bolt-locking means in a second position;

Figure 2:
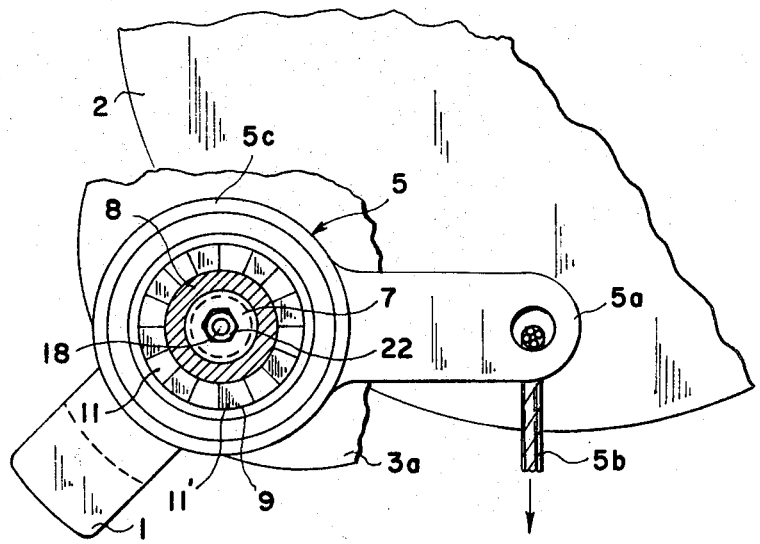
FIG. 2 is a view taken generally along the line II—II of FIG. 1.
Figure 3:
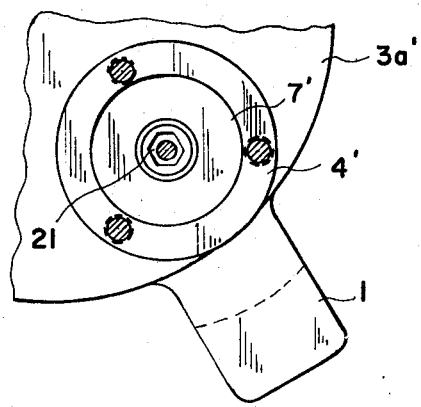
FIG. 3 is a view taken along the line III—III of FIG. 1 with the rear plate of the brake removed.

In FIGS. 1–5 I show a floating-yoke brake whose yoke 1 is axially shiftable in a brake support or housing (not shown) relative to which the brake disk 2 is journaled. Each of the braking faces 2a and 2a' of the disk 2 is flanked by and juxtaposed with a respective brake lining 3, 3' on a respective backing plate 3a, 3a', so that the brake shoes 3, 3a and 3', 3a' are formed on opposite sides of the disk 2. The shoes 3, 3a and 3', 3a' are shiftable in the direction of arrows D and D', perpendicular to the braking faces 2a and 2a', by respective pressure blocks 4 and 4' which bear upon the respective backing plates 3a, 3a' and are similarly shiftable in the arms 1a and 1a' of the yoke 1. The pressure blocks 4 and 4' and the yoke 1 are nonrotatable about the axis 18 of the brake system.

Figure 6:
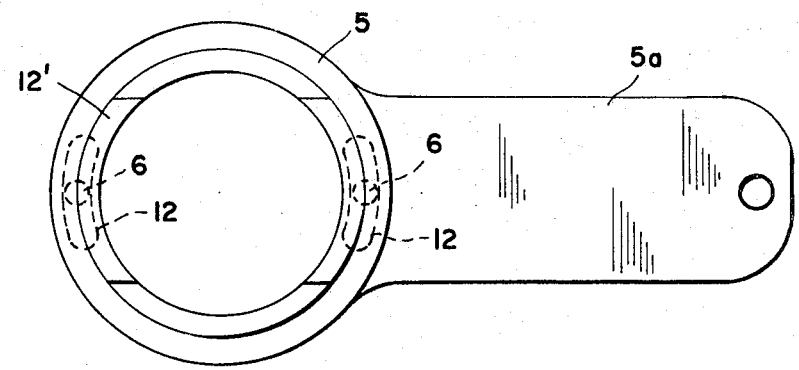
FIG. 6 is an elevational view of part of the mechanism for actuating the brake of FIGS. 1–5.

The actuating means for the brake comprises, as best seen in FIGS. 1, 2 and 5, an actuating lever 5 whose arm 5a may be connected with mechanical or hydraulic brake-actuating means of any conventional type via a cable 5b. The actuating lever 5, moreover, has an annular disk portion 5c whose recesses 12 (FIG. 6) so accommodate camming balls 6 that the balls ride along the segmental ramps 12 to cam the disk 5 axially (to the right in FIG. 1) while urging a ring 6a having similar ramps to the left (arrow D). The ball-incline arrangement may be of the type described and illustrated in Principles of Automotive Vehicles, U.S. Government Printing Office, 1956, pages 427 ff. As indicated in FIG. 6, two balls 6 are provided for co-operation with the diametrically opposite ramps 12 of the actuating lever 5. Rotation of the disk portion 5c of the lever 5 causes an axial shift of the ring 6a, as represented by the double-headed arrow 6b, so that the pressure block 4 of the yoke (and the yoke itself if it is secured to this pressure block) and block 4' are shiftable in the direction of arrow D. The ring 6a is secured by bolts 6c (one shown in FIG. 1) to the pressure block 4 while a further ring 6d is formed with apertures receiving the balls 6 with play and thus forms a cage for the balls to ensure their proper positioning. Entry of dust and other contaminants to the braking ramps 12 is prevented by a shield 6e which frictionally engages a sealing ring 6f seated in a circumferential groove of the ring 6a.

According to an important aspect of this invention, the pressure block 4', which may be axilly movable within the arm 1a' of the yoke 1 as previously mentioned, is formed with a generally cup-shaped seat 4a' of rotationally symmetrical configuration coaxial with a bore 4b' through this block 4' and with the axis 18. The head 7' of a threaded bolt 7 is of complementary configuration and nested in the seat 4a' so that, in the absence of a locking device described in greater detail hereinafter, the bolt 7 is capable of rotating in contact with the pressure block 4' and relatively thereto. The bolt 7 traverses the bore 4b' of the pressure block 4' and the corresponding bore 4b aligned therewith in the pressure block 4 and threadedly receives a thimble or sleeve 8. The bolt 7 is, of course, located adjacent the periphery of the disk 2 while the brake shoes 3, 3a and 3', 3a' extend along sectors thereof in the usual manner. The thimble 8, whose boss 8a is flattened at 8b to form a polygon (e.g. a hexagonal head engageable by a wrench), also comprises an annular radial flange 8c juxtaposed with the disk portion 5c of the actuating lever 5. A ratchet coupling 9 interconnects the thimble 8 and this actuating member 5.

Figure 4:
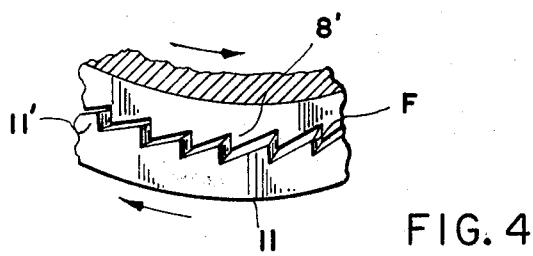
FIG. 4 is a perspective detail view, drawn to an enlarged scale, of a ratchet coupling for the system of FIGS. 1–3.

The ratchet coupling 9 illustrated in FIGS. 1–6 comprises a ring 11 which surrounds a tubular shank 8d of the thimble 8 and has sectoral formations constituted as rearwardly extending guide pins 10 which project through cutouts 12 (FIG. 6) formed diametrically opposite one another along the inner periphery of the disk portion 5c of the actuating lever 5. The teeth 11' of ring 11 (FIG. 2 or 4) may engage the complementary teeth 8' formed directly on the flange 8c of the head of thimble 8. The teeth 8' may, of course, also be formed upon a ring keyed to the thimble 8. As illustrated in FIG. 4, rotation of the teeth 11' to the left and/or the teeth 8' to the right will cause the interengaging ramps of the complementary teeth to ride along one another until the ratchet members have been moved axially through a distance equal to twice the height of the steep flank F of the ratchet members. Reverse rotation is prohibited upon engagebent of the steep flanks of the sets of teeth with one another.

The threaded bolt 7 (FIG. 1) is tubular and receives an axially extending pin 17 which is axially slidable in the bolt 7. The pin 17 is urged to the right (FIG. 1) by a coil spring 17' bearing against its head 17a and located in a recess 22a below a polygonal socket 22 at the actuating side (right) of the brake as illustrated in FIG. 1. The socket 22 may be hexagonal to receive a standard key such as an Allen wrench which can be thrust into it through the passage 8e of the thimble 8. An undulating or corrugated annular spring 15 bears upon the actuating disk 5 and the ratchet ring 11 to accommodate the axial movement of the latter within the distance determined by the flank height as previously mentioned. It should be noted that, via the formation 10, 12', a limited lost-motion connection is provided in the angular sense between the actuating member 5 and its ratchet ring 11. A sealing cuff 16 is disposed between the flange 8c of thimble 8 and the actuating disk 5c to prevent entry of dirt or other contaminants to the region of the self-adjusting ratchet assembly.

The axially shiftable pin 17 is provided at its extremity remote from the head 17a and the socket 22 with a head 19 (of hexagonal configuration for engagement by a conventional wrench) which, under the action of spring 17', is seated in a hexagonal socket 21 of the head 7' of bolt 7. A cover plate 20 likewise is provided with a polygonal (e.g. hexagonal) aperture 20' into which the hexagonal head 19 projects; the cover plate 20' is held onto the block 4' via bolts 4c'.

In operation, rotation of the lever 5 about the axis 18 causes the ball-and-ramp force-transmitting arrangement 6, 12 to cam the pressure block 4 and yoke 1 axially in the direction of arrow D to bring the brake lining 3 against the flank 2a of the brake disk 2. Concurrently, the reaction force of the actuating lever 5 acts in the direction of arrow D' via the ratchet means 9 and is transferred to the pressure block 4' via the bolt 7 threadedly engaged by the thimble 8. The brake lining 3' is thus also brought to bear upon the disk 2. Normally, the total axial displacement of the brake shoes and the camming system 10, 12 will be less than twice the height of the flanks F and the teeth 11' will slide along the teeth 8' which remain nonrotated since the thimble 8 is held against rotation by an elastic ring 8f mounted on its shank 8d and engaging the inner periphery of the ring 6a which in turn is rigid with the nonrotatable block 4 of brake shoe 3. When the brake actuator 5 is released, however, the brake shoes are forced outwardly with rotation of the disk 2 and the original brake play is restored.

When, however, one or both brake linings 3, 3' wear sufficiently, the total displacement of the brake shoe will exceed twice the height of flanks F and rotation of the lever 5 will continue beyond one or more teeth so that the sets of teeth 8', 11' are offset relatively by one or more teeth as indicated in FIG. 4. Upon release of the lever 5, however, the usual spring or other conventional restoring means will cause it to swing in the opposite direction and bring the steep flanks of the sets of teeth into abutting relationship. Further rotation in this sense with the teeth matingly engaged will drive the thimble 8 to thread it further into the bolt 7 and draw the blocks 4 and 4' closer together, thereby compensating for wear of the brake shoe. The spring 15 holds the teeth 8', 11' in contact with one another and is compressed when, during brake actuation, the ring 11 is cammed axially via the inclined flanks of the teeth.

For turning back the self-adjusting mechanism or for manual adjustment of the brakes, a key of hexagonal section (e.g. the Allen wrench A of FIG. 5) is inserted axially into the socket 22 to drive the pin 17 to the left.

The hexagonal head 19 of the pin 17 thus emerges from the socket 21 of the bolt 7. This head 19 may now be engaged by a wrench W and, while the head 8b of the thimble is held against rotation by a wrench or the ratchet assembly 9, the bolt 7 can be rotated to adjust the brake positions. Upon withdrawal of the Allen wrench A, the pin 17 is urged to the right by the spring 17' (FIG. 5) and the head 19 withdrawn into the socket 21. The previously removed cover plate 20 can then be replaced.

Figure 7:
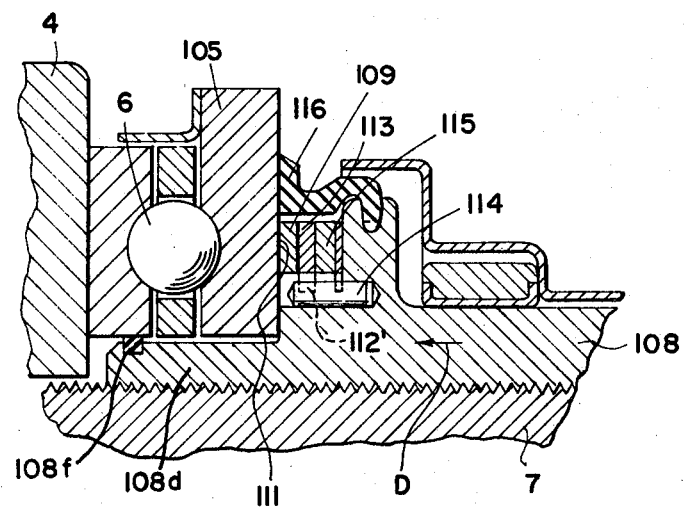
FIG. 7 is a fragmentary axial cross-sectional view of another embodiment of the present invention.

In FIG. 7, I show a system which functions similarly and corresponding parts are thus identified with identical reference numerals preceded by a hundreds designation. Thus the ratchet assembly 109 of this embodiment includes an annular toothed disk 113 whose teeth engage the complementary teeth 111 formed directly upon the actuating lever 105. The undulating annular spring 115 here urges the ring 113 in the direction of the actuating member 105 while rotatable entrainment between this ring and the thimble 108 is effected by means of indentations 112' into which guide pin 114, rigid with the thimble 108, projects. The ring 113 is thus keyed to the thimble 108 which threadedly engages the bolt 7 but is axially shiftable in the direction of arrow D to maintain contact between the complementary teeth. The sealing cuff 116 here is received in the thimble 108 and bears frictionally upon the actuating member 105. Here, too, a friction ring 108f on the shank 108d of thimble 108 keeps the latter from rotating in the absence of positive engagement of the teeth of the ratchet assembly, the latter being effective only to entrain the thimble in a sense to reduce the separation of the brake shoes.

The invention described and illustrated is believed to admit of many modifications within the ability of persons skilled in the art, all such modifications being considered to come within the spirit and scope of the invention except as otherwise limited by the appended claims.

I claim:

1. A disk brake comprising a brake disk; a pair of brake shoes flanking said disk and displaceable toward and away from respective braking faces thereof; brake-actuating means including an actuating disk rotatable about an axis generally perpendicular to said faces; force-transmitting means between said actuating disk and one of said brake shoes for camming same axially in the direction of said brake disk upon rotation of said actuating disk; and means including a self-adjusting mechanism for applying a reaction force from said actuating disk to the other of said brake shoes, said mechanism comprising a bolt extending along said axis and bearing upon said other brake shoe, a thimble threadedly engaging said bolt and coaxial therewith, said thimble including a tubular shank traversing said actuating disk and a head confronting said actuating disk, and annular ratchet means on said shank between said actuating disk and said head operatively connected to said actuating disk and said thimble for unidirectionally rotating the latter relatively to said bolt upon rotation of said actuating disk in one sense to reduce the spacing of said brake shoe in the axial direction, said shank being in frictional engagement with said one of said brake shoes for resisting entrainment of said thimble by said actuating disk upon rotation of the latter in the opposite sense.

2. A disk brake as defined in claim 1 wherein said ratchet means includes a first annular set of teeth rotatably entrained by said actuating disk; a second set of teeth complementarily engageable with said first set of teeth and confronting them while rotatably entraining said thimble therewith, and spring means yieldable to permit relative axial displacement of said sets of teeth through a distance equal to the altitudes of the teeth of said sets while urging said sets of teeth axially together, the teeth of said sets being oriented in opposite senses.

3. A disk brake as defined in claim 2 wherein said first set of teeth is formed upon a toothed ring coaxial with said thimble and said bolt, said toothed ring having formations extending axially away from said thimble and said actuating disk being provided with recesses receiving said formations for entrainment of said toothed ring with said actuating disk.

4. A disk brake as defined in claim 2, further comprising locking means remote from said thimble for releasably securing said bolt against rotation about said axis.

5. A disk brake as defined in claim 2, further comprising a floating yoke carrying said brake shoes and extending around the periphery of said disk.

6. A disk brake as defined in claim 5 wherein said force-transmitting means includes an inclined-ramp camming arrangement disposed between said actuating disk and said yoke.

7. A disk brake as defined in claim 2 wherein said second set of teeth is formed on a toothed ring loosely mounted on said shank, said ring and said thimble being provided with interacting formations forming a lost-motion rotary coupling therebetween.

8. A disk brake as defined in claim 2 wherein said ratchet means includes a toothed ring formed with one of said sets of teeth and shiftable in axial direction on said shank, said spring means including an annular corrugated spring interposed between said toothed ring and said head.

9. A disk brake comprising a brake disk, a pair of brake shoes flanking said disk and dispalceable toward and away from respective braking faces thereof; brake-actuating means including an actuating disk rotatable about an axis generally perpendicular to said faces; force-transmitting means between said actuating disk and one of said brake shoes for camming same axially in the direction of said brake disk upon rotation of said actuating disk; and means including a self-adjusting mechanism for applying a reaction force from said actuating disk to the other of said brake shoes, said mechanism comprising a bolt extending along said axis and bearing upon said other brake shoe, a thimble threadedly engaging said bolt and coaxial therewith, annular ratchet means on said shank between said actuating disk and said thimble operatively connected to said actuating disk and said thimble for unidirectionally rotating the latter relatively to said bolt upon rotation of said actuating disk in one sense to reduce the spacing of said brake shoes in the axial direction, said bolt having a rotationally symmetrical head remote from said thimble and said other of said brake shoes being provided with a rotationally symmetrical seat receiving said head, releasable locking means for said bolt including a pin extending axially through said bolt and accessible in the region of said thimble, and a noncircular formation carried by said pin and engaging said head for preventing rotation of said bolt, said pin being axially shiftable for withdrawing said formation to permit rotation of said bolt.

10. A disk brake as defined in claim 9 wherein said noncircular formation is a polygon, said head having a polygonal socket of complementary configuration receiving said formation, said bolt having a polygonal socket at its end proximal to said thimble, said pin extending into said socket proximal to said thimble and being axially shiftable upon insertion of a key therein, said locking means including a spring bearing axially upon said pin for yieldably retaining said formation in said head.

References Cited

UNITED STATES PATENTS

| | | | |
|---|---|---|---|
| 2,804,176 | 8/1957 | Trevoskis | 188—73 |
| 3,111,198 | 11/1963 | Hodkinson. | |
| 3,155,195 | 11/1964 | Browerman. | |
| 3,211,263 | 10/1965 | Harrison. | |
| 3,318,420 | 5/1967 | Adams | 188—73 |

FERGUS S. MIDDLETON, *Primary Examiner.*

GEORGE HALVOSA, *Examiner.*